US007753352B2

(12) United States Patent
Yu et al.

(10) Patent No.: US 7,753,352 B2
(45) Date of Patent: Jul. 13, 2010

(54) HOLDING MEMBER FOR CLEANING OPTICAL COMPONENTS

(75) Inventors: Tai-Cherng Yu, Tu-Cheng (TW); Hsin-Ho Lee, Tu-Cheng (TW); Tsai-Shih Tung, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 964 days.

(21) Appl. No.: 11/309,755

(22) Filed: Sep. 22, 2006

(65) Prior Publication Data

US 2007/0163070 A1 Jul. 19, 2007

(30) Foreign Application Priority Data

Jan. 13, 2006 (TW) .............................. 95101369 A

(51) Int. Cl.
*B23Q 3/00* (2006.01)

(52) U.S. Cl. .................. 269/289 R; 269/43; 269/302.1; 29/281.1

(58) Field of Classification Search ............. 269/289 R, 269/302.1, 43, 45, 55; 29/281.1; 15/268
See application file for complete search history.

(56) References Cited

U.S. PATENT DOCUMENTS

| | | | | |
|---|---|---|---|---|
| 5,899,446 | A * | 5/1999 | Thompson | 269/55 |
| 5,938,185 | A * | 8/1999 | Kletter | 269/289 R |
| 6,513,803 | B2 * | 2/2003 | Morales et al. | 269/290 |
| 6,651,970 | B2 * | 11/2003 | Scott | 269/289 R |
| 6,810,552 | B2 | 11/2004 | Miyake et al. | |
| 7,469,886 | B2 * | 12/2008 | Shen et al. | 269/21 |
| 7,637,488 | B2 * | 12/2009 | Zeng | 269/302.1 |
| 2005/0040580 | A1 * | 2/2005 | Davis | 269/289 R |
| 2006/0181773 | A1 | 8/2006 | Yen | |
| 2007/0163070 | A1 * | 7/2007 | Yu et al. | 15/268 |

FOREIGN PATENT DOCUMENTS

| | | |
|---|---|---|
| CN | 1687814 A | 10/2005 |

* cited by examiner

*Primary Examiner*—Lee D Wilson
(74) *Attorney, Agent, or Firm*—Jeffrey T. Knapp

(57) ABSTRACT

A holding member for facilitating the cleaning of optical components includes two end walls and at least two spaced plates. The two end walls face toward each other. One of the two end walls defines at least one through slot. The at least two spaced plates are held between the two end walls and define at least one pair of respective inner surfaces. Each respective pair of inner surfaces has a pair of corresponding elongated grooves defined therein along a longitudinal direction thereof. Each slot communicates with a respective pair of elongated grooves. In particular, each such through slot and the respective pair of elongated grooves associated therewith are cooperatively aligned with one another in a manner so as to direct the optical components into the respective pair of corresponding elongated grooves.

16 Claims, 7 Drawing Sheets

HOLDING MEMBER FOR CLEANING OPTICAL COMPONENTS

FIELD OF THE INVENTION

The present invention relates to cleaning apparatus for optical components and, more particularly, to a holding member for optical components to be cleaned.

DESCRIPTION OF RELATED ART

Optical components, especially aspheric glass lenses, are widely used in digital cameras, video recorders, compact disc players, and other optical systems due to their excellent optical properties. To achieve high optical quality, the optical components generally require rigorous cleaning.

However, during many processes for manufacturing the optical components, the optical components are prone to becoming soiled. For example, before coating films onto the optical components, the optical components need to be cleaned to remove contaminants attached thereto, such as fats, oils, and/or dust, so that the films can be firmly adhered to the optical components during coating. After coating, coating material or some other unwanted debris might be deposited onto undesired portions of the optical components. Additionally, debris, especially that with a hardness equal to or greater of that of the lenses, can potentially result in scratching of such lenses. As a result, cleaning apparatuses are needed to help ensure excellent optical properties.

Typically, when the optical components are to be cleaned, an operator cleans surfaces of the optical components by wiping them with a simple cleaning tool, e.g., a cleaning sheet or paper impregnated with ethyl alcohol or spraying nitrogen gas upon them. In the wiping cleaning operation, the amount of alcohol to be used and the degree of wiping can change, depending on the operator. Thus, the cleaning tends to vary. Furthermore, the optical components can be soiled again by hands of the operator. Therefore, a holding member may be used to hold the optical components for facilitating the cleaning process.

Referring to FIG. 7, a typical holding member 10 employs three holding poles for the optical components. The holding member 10 includes a holding frame 111 and three clamping poles 20*a*, 20*b*, 20*c*. The base 11 includes an upper board 112, a lower board 114, and four pillars 13. The three clamping poles 20*a*, 20*b*, 20*c* are parallel to each other and are moveably secured between the upper and lower board 112 and 114. The three clamping poles 20*a*, 20*b*, 20*c* define three groups of V-shaped grooves 21. The optical components can be held between the three groups of V-shaped grooves 21. Then, the holding member 10 with the optical components held thereby is immersed in a pool (not shown) containing cleaning solution to wash the optical components.

Nevertheless, in operation of this holding member, the optical components may be improperly fastened between the three groups of clamping poles. Distances between the three groups of clamping poles may be inaccurate. That is, the holding member may hold the optical components excessively tightly or too loosely. In the situation of excessively tight fastening, the optical components are prone breakage due to a pressure of the three groups of clamping poles. In the situation of excessively loose fastening, the optical components can much more easily slide out of the grooves of the clamping poles when immersed in the cleaning solution, resulting in process down time to recover such optical components from the container holding the cleaning solution.

Furthermore, the three groups of V-shaped grooves can suffer from a leveling error due to frequently relocation of the clamping poles. The leveling error will result in a slant of the optical components with respect to the grooves, thereby potentially forming scrapes on the optical components due to a pressure concentration at the edges of the grooves. The three groups of V-shaped grooves have a certain thickness and depth, thereby generating turbulence in a flow of the cleaning solution to some extent. Thus, portions of the optical components inserted into the V-shaped grooves cannot be cleaned as effectively as desired.

What is needed, therefore, is a holding member that is readily operated and controlled to thereby facilitate the holding of a plurality of optical components and thus allow such optical components to be cleaned effectively.

SUMMARY OF INVENTION

In accordance with a preferred embodiment, a holding member includes two end walls and at least two spaced plates. The two end walls face toward each other. One of the two end walls defines at least one through slot. The at least two spaced plates abut between the two end walls and have at least one pair each of inner surfaces. Each pair of inner surfaces defines a pair of elongated grooves along a longitudinal direction thereof. Each slot is in communication with its respective pair of elongated grooves for directing/positioning the optical components thereinto.

Other advantages and novel features will be drawn from the following detailed description of preferred embodiments in conjunction with the attached drawings.

BRIEF DESCRIPTION OF THE DRAWINGS

Many aspects of the present holding member can be better understood with reference to the following drawings. The components in the drawings are not necessarily drawn to scale, the emphasis instead being placed upon clearly illustrating the principles of the present holding member. Moreover, in the drawings, like reference numerals designate corresponding parts throughout the several views.

DETAILED DESCRIPTION

Embodiments of the present holding member will now be described in detail below and with reference to the drawings.

Figure 1:
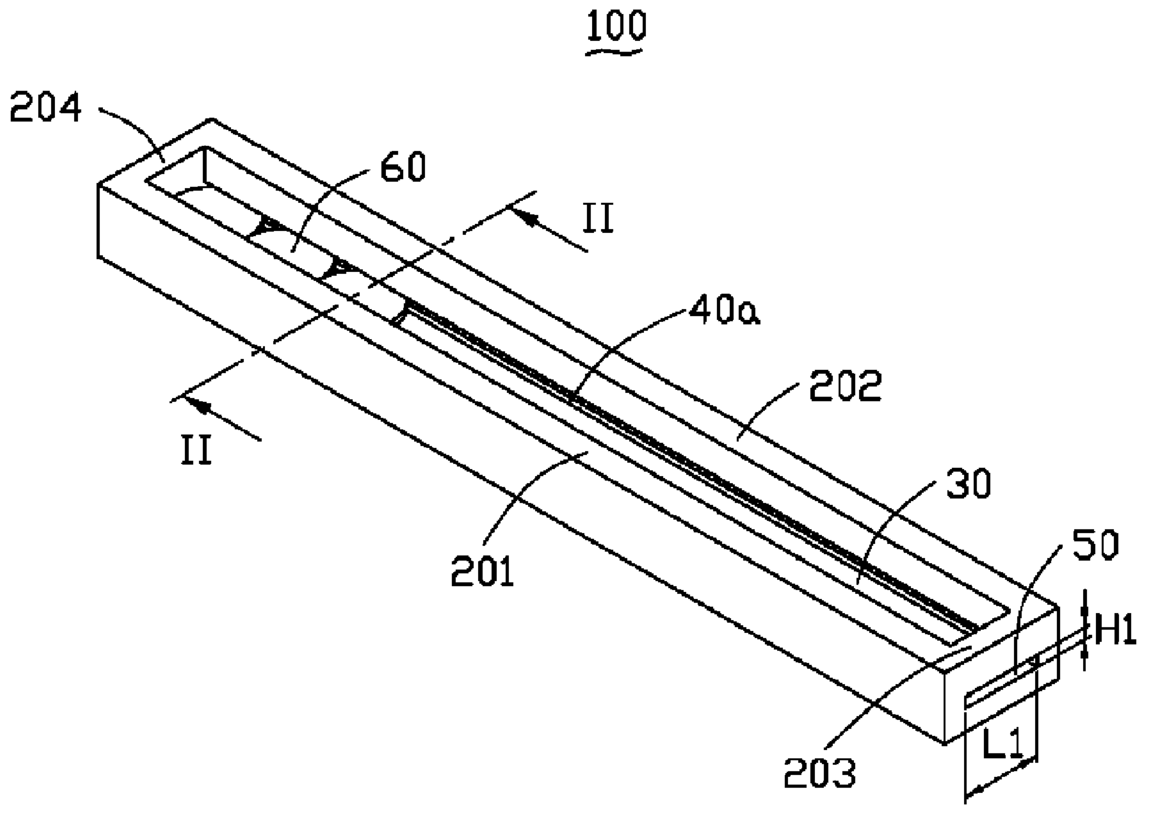
FIG. 1 is a schematic, isometric view of a holding member for optical components, according to a first preferred embodiment.
Figure 2:
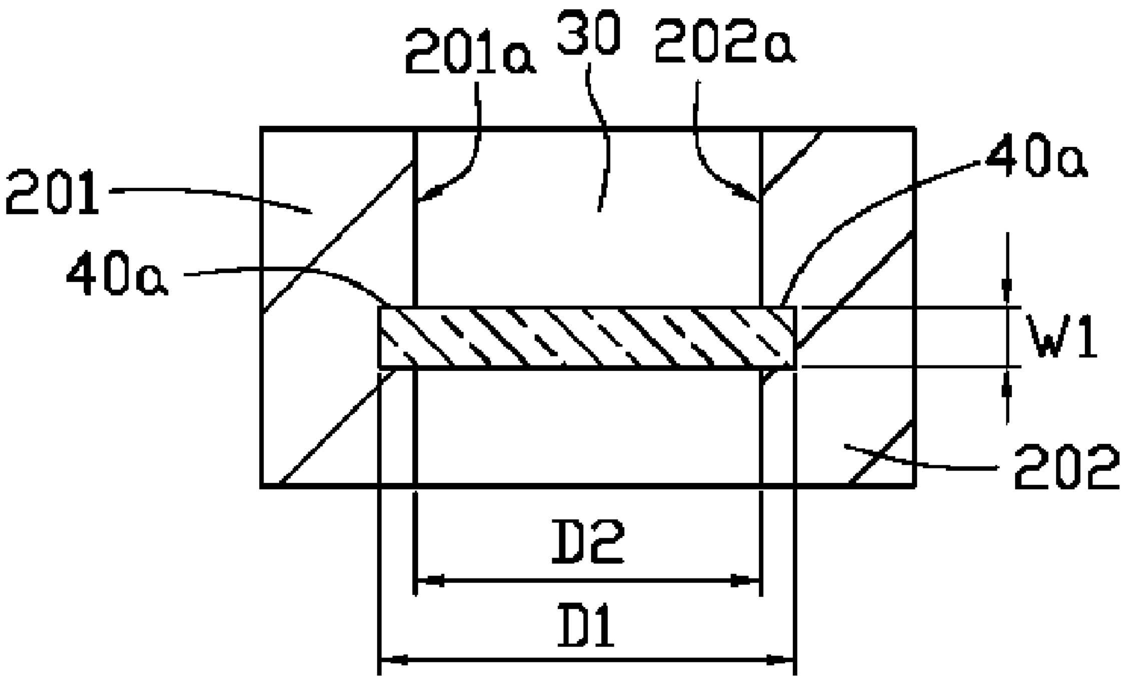
FIG. 2 is a schematic, cross-sectional view taken along a line II-II of FIG. 1.

FIGS. 1 and 2 illustrate a first kind of holding member 100 for facilitating the cleaning of optical components 60, in accordance with a first preferred embodiment. The holding member 100 includes a first rib plate 201, a second rib plate 202, a first end wall 203, and a second end wall 204. The first and second end walls 203, 204 are essentially parallel to each other. Each of the first and second rib plates 201, 202 abuts both the first and second end walls 203, 204, each extending therebetween. The first and second rib plates 201, 202 are essentially parallel to each other and are essentially perpendicular to the first and second end walls 203, 204. The first and second rib plates 201, 202 and the first and second end walls 203, 204 cooperatively form an interspace 30 therebetween.

The first and second rib plates 201, 202 and the first and second end walls 203, 204 can be made of any of a variety of durable, corrosion-resistant materials such as plastic, steel, Bakelite (i.e., a kind of thermosetting phenol formaldehyde resin), Teflon (i.e., PTFE), etc. Beneficially, such elements 201-204 can have and maintain an outer surface not prone to scratching the optical components 60 being held thereby. Such outer surface can for example be a finished surface. The first and second rib plates 201, 202 and the first and second end walls 203, 204 can be, e.g., generally rectangular in shape. The first and second rib plates 201, 202 can be configured (i.e., structured or arranged) to have enough length for holding numerous optical components 60, while the width of the end walls 203, 204 is aptly chosen based upon the diameter of the optical components 60 to be held by the holding member 100.

The first and second rib plates 201, 202 have a pair of respective inner surfaces 201*a*, 202*a* facing toward each other. The pair of inner surfaces 201*a*, 202*a* define a pair of corresponding elongated grooves 40*a* extending along a longitudinal direction of the two inner surfaces 201*a*, 202*a*. Such a pair of corresponding grooves 40*a* are aligned with one another across interspace 30. The first end wall 203 has defined therein a through slot 50 adjoining and communicating with the pair of elongated grooves 40*a*. The through slot 50 has an open space fitting with dimensions of the II-II cross-sectional portion of the optical components 60 (as best seen in FIG. 2), the through slot 50 and the elongated grooves 40*a* being cooperatively aligned with one another in a manner so as to direct the optical components 60 into the elongated grooves 40*a*.

The elongated grooves 40*a* advantageously have space dimensions for fitting/conforming with peripheral contours of the optical components 60, and are spaced at a predetermined distance from each other via the end walls 203, 204. As such, the elongated grooves 40*a* are suitably structured and arranged for inserting/receiving the optical components 60 thereinto. For example, the elongated grooves 40*a* can be partially rectangular (i.e., 3 of 4 sides), curved, semi-ellipsoid, semicircular, etc. In the illustrated embodiment, the elongated grooves 40*a* are partially rectangular. The elongated grooves 40*a* each have a predetermined groove height W1. The groove height W1 of the elongated grooves 40*a* can, beneficially, be large so that the optical components 60 can be kept in the elongated grooves 40*a* and can move and turn in the interspace 30, but yet small enough so that no legitimate potential for an unwanted dislodging (i.e., failure to successfully hold an optical component 60) exists. Accordingly, after cleaning for a predetermined time, portions of the optical components 60 previously inserted into the elongated grooves 40*a* can be turned out of the elongated grooves 40*a* and can be substituted for other portions of the optical components 60 by moving and turning. As a result, all the portions of the optical components 60 can be sufficiently cleaned.

The elongated grooves 40*a* cooperatively define a space distance D1 between groove bottoms thereof. The space distance D1 is essentially equal to or slightly larger than a diameter/width of the optical components 60 along the II-II cross-sectional direction. The inner surfaces 201*a* and 202*a* cooperatively define a space distance D2 therebetween. The space distance D2 is smaller than diameter/width of the optical components 60 along the II-II cross-sectional direction. The elongated grooves 40*a* each have a predetermined groove depth D satisfying an equation: D=(D1−D2)/2. The space distance D2 plus the groove depth D is smaller than the diameter/width of the optical components 60 along the II-II cross-sectional direction, thereby preventing the optical components 60 from sliding out of one of the respective elongated grooves 40*a*. The through slot 50 has a slot height H1 and a slot length L1, slightly larger than a thickness of the optical components 60 and the diameter/width of the optical components 60 along the II-II cross-sectional direction, respectively, in order to permit insertion of an optical component 60 through the through slot 50. The slot height H1 is equal to or larger than the groove height W1. The slot length L1 is equal to or larger than the space distance D1.

The optical components 60 can, for example, be optical lenses, UV-cut filters, spacers, or the like. In the illustrated embodiment, the optical components 60 are aspheric lenses. As an example, an optical lens has a thickness of about 0.3 millimeters and a diameter about 3.0 millimeters. In this situation, the groove height W1 can be in the range from about 0.3 millimeters to about 0.4 millimeters. The groove depth D can be in the range from about 0.25 millimeters to about 0.5 millimeters. The space distance D1 can be in the range from about 4.0 millimeters to about 5.0 millimeters. The space distance D2 can be in the range from about 3.5 millimeters to about 4.0 millimeters. The height H1 of the through slot 50 can be in the range from about 0.3 millimeters to about 0.4 millimeters. The length L1 of the through slot 50 can be in the range from about 3.5 millimeters to about 4.0 millimeters.

Figure 3:
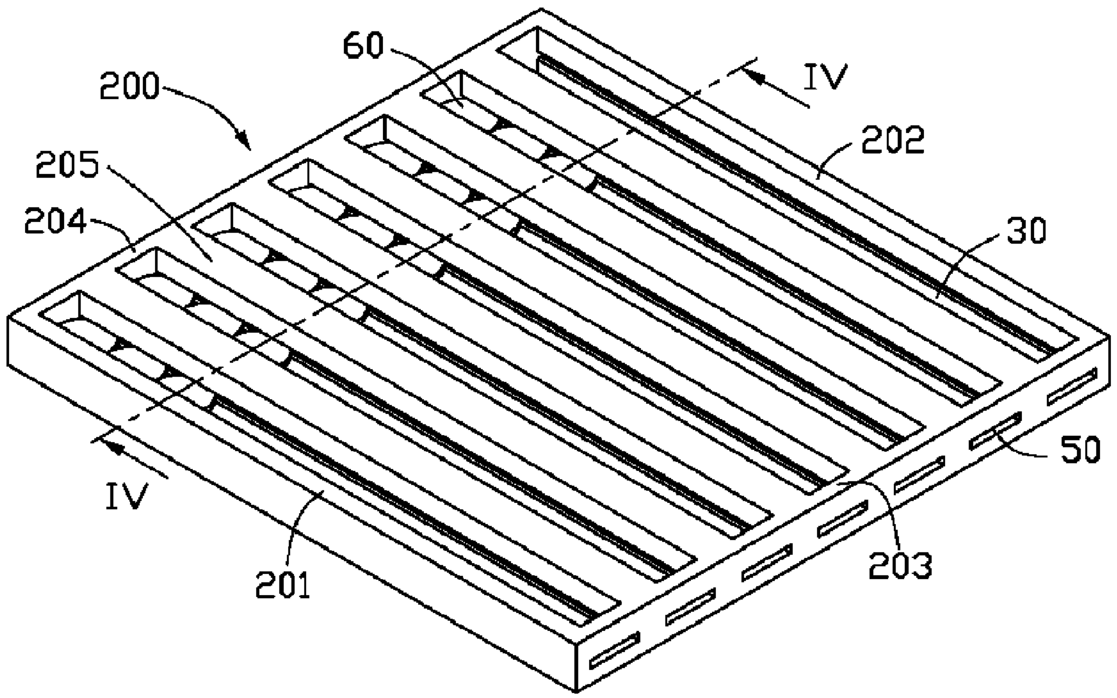
FIG. 3 is a schematic, isometric view of another holding member for optical components, according to a second preferred embodiment.
Figure 4:
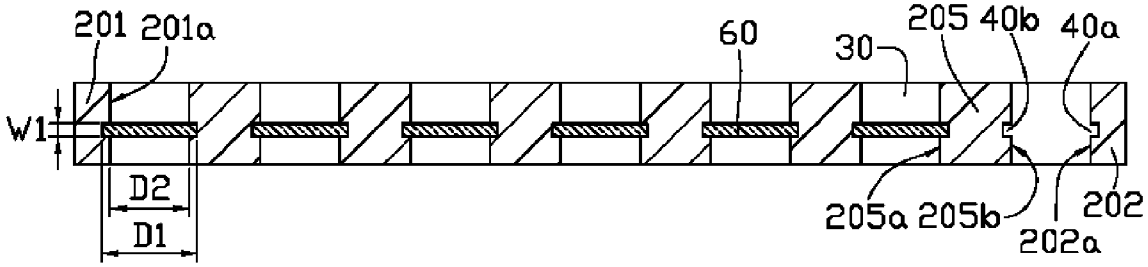
FIG. 4 is a schematic, cross-sectional view taken along a line IV-IV of FIG. 3.

FIGS. 3 and 4 illustrate a second kind of holding member 200, according to a second preferred embodiment. The holding member 200 is essentially similar to the holding member 100, except that the holding member 200 includes a plurality of aligned spacer plates 205 held between the first end wall 203 and the second end wall 204 and the first end wall defines a plurality of through slots 50.

Each spacer plate 205 is similar to the first/second rib plates 201, 202 except that each spacer plate 205 has two opposing side faces 205*a* and 205*b* each defining an elongated groove 40*b*. The elongated grooves 40*b* of the spacer plates 205 and the elongated grooves 40*a* of the first and second rib plates 201, 202 form a plurality of pairs of elongated grooves. Each through slot 50 corresponds to a pair of elongated grooves and communicates with the corresponding pair of elongated grooves. Accordingly, the optical components 60 can be inserted into/between each respective pair of elongated grooves across the corresponding through slot 50. In an alternative embodiment, the plurality of through slots 50 can be in communication with each other, thereby forming an elongated through slot communicating with all the elongated grooves 40*a* and 40*b*.

The elongated grooves 40*b* of the spacer plates 205 have dimensions and spacing distance similarly to elongated grooves 40*a* of the first/second rib plates 201, 202, as described in the first embodiment. The spacer plates 205 and the first and second rib plates 201, 202 can be spaced from each other in uniform intervals. Thus, each pair of elongated grooves 40*a*/40*b* defines a uniform spacing distance D1 and D2. Alternatively, the spacer plates 205 and the first and second rib plates 201, 202 can be spaced from each other at varying intervals. For example, the first rib plate 201, the spacer plates 205, and the second rib plate 202, in that general order, can have increasingly ascending spacing distances therebetween. Accordingly, various kinds of optical components 60 with different IV-IV cross-sectional dimensions can be inserted into corresponding matching elongated grooves 40*a* and 40*b*. Alternatively, the elongated grooves 40*a* and 40*b* could have various space dimensions, such as for example, D1, D2, D, or W1, for inserting various kinds of optical components 60 with corresponding dimensions thereinto.

Figure 5:
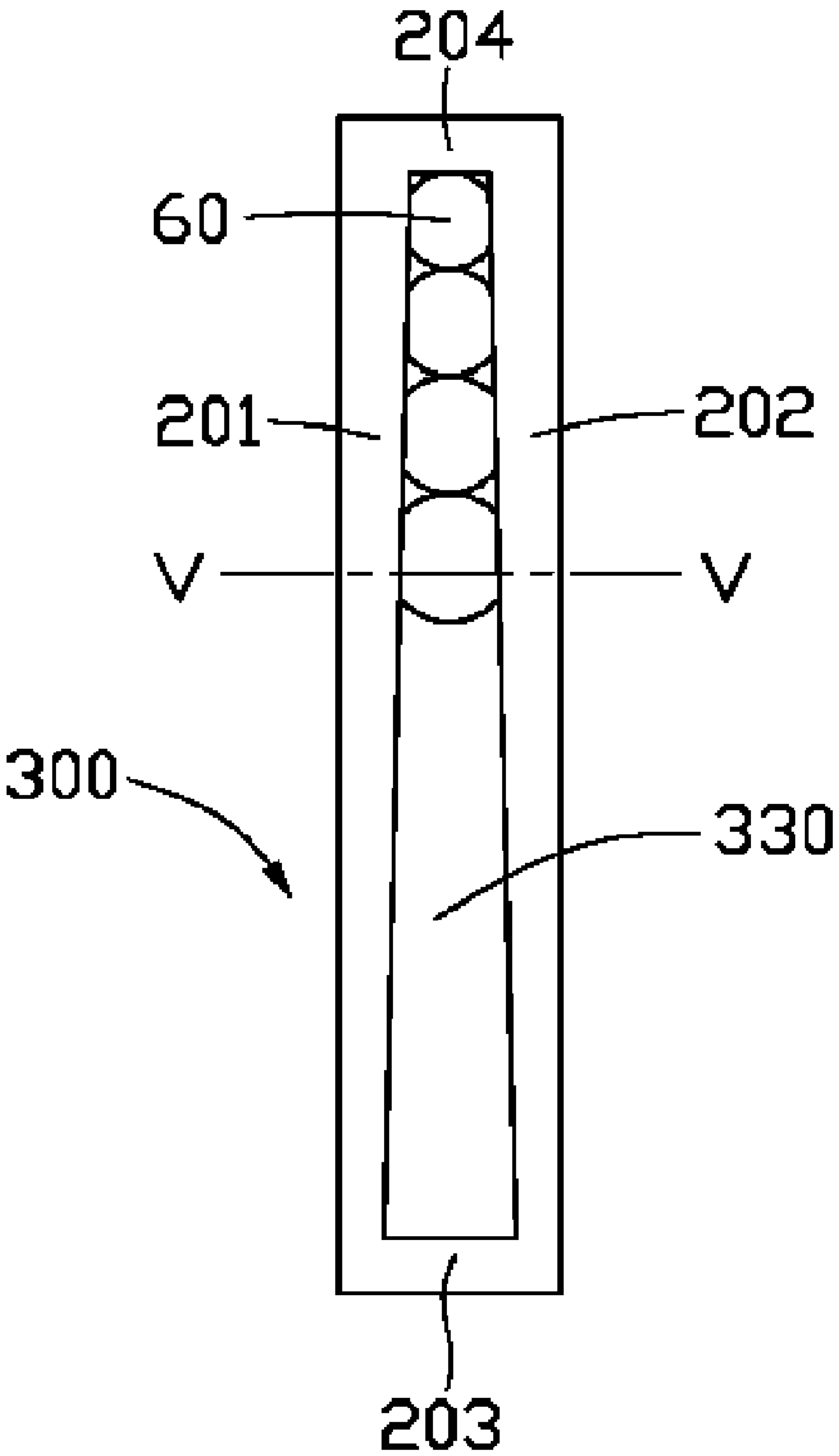
FIG. 5 is a schematic, plan view of an alternative holding member for optical components, according to a third preferred embodiment.

FIG. 5 illustrates a third kind of holding member 300 for use in the cleaning of the optical components 60, according to a third preferred embodiment. The holding member 300 is essentially similar to the holding member 100 except of an interspace 330 defined between the first and second rib plates 201, 202 and the first and second end walls 203, 204. The interspace 330 is a tapered space. The two rib plates 201, 202 are advantageously tapered or trapezoidal in shape. For example, the relatively wider bottom space of the tapered interspace 330 is adjacent to the first end wall 203, while a relatively narrower top space of the tapered interspace 330 is adjacent to the second end wall 204. As such, various kinds of optical components 60 with different V-V cross-sectional dimensions can be arranged into the elongated grooves in order of ascending size.

Figure 6:
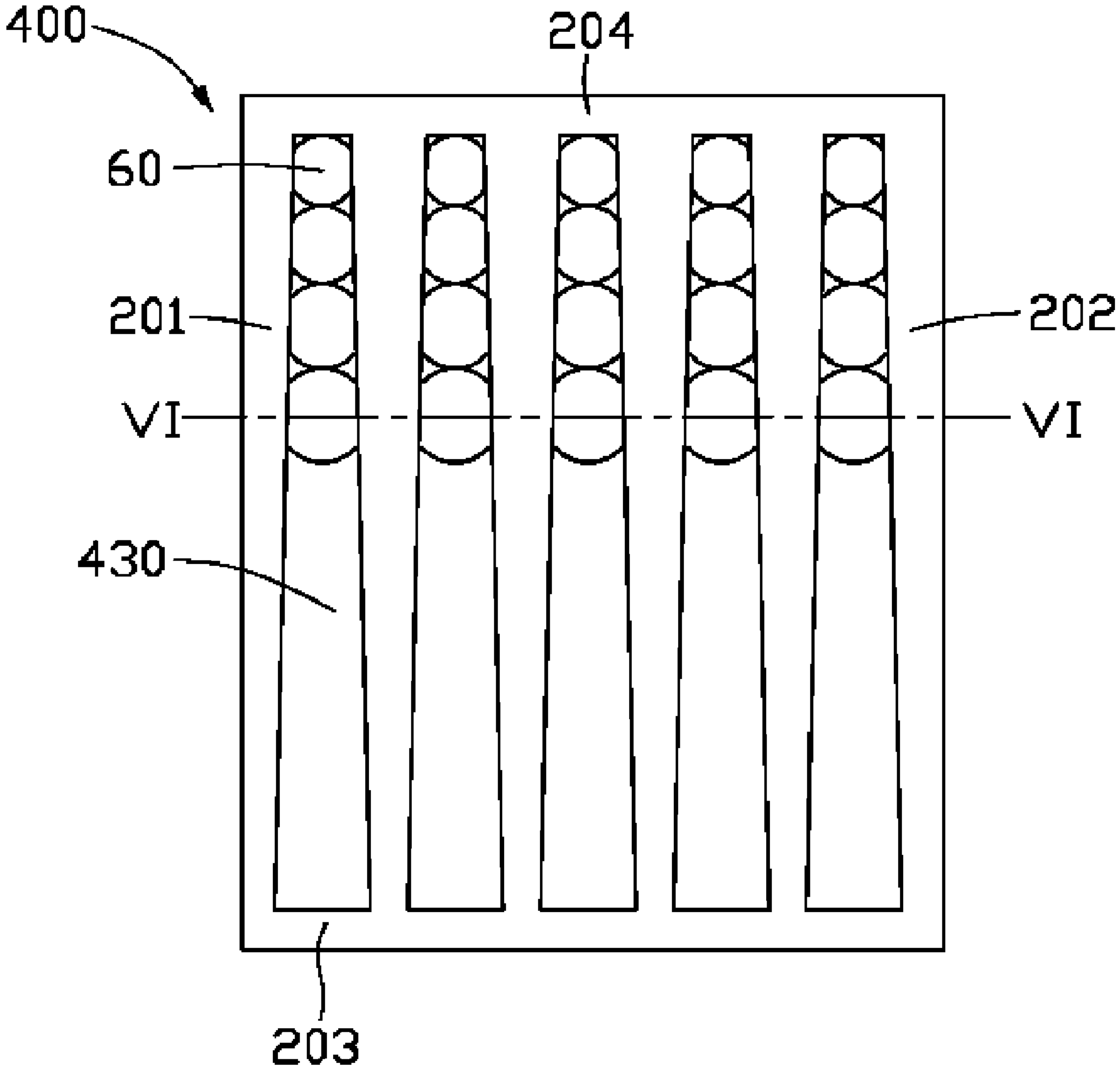
FIG. 6 is a schematic, plan view of another alternative holding member for optical components, according to a fourth preferred embodiment.
Figure 7:
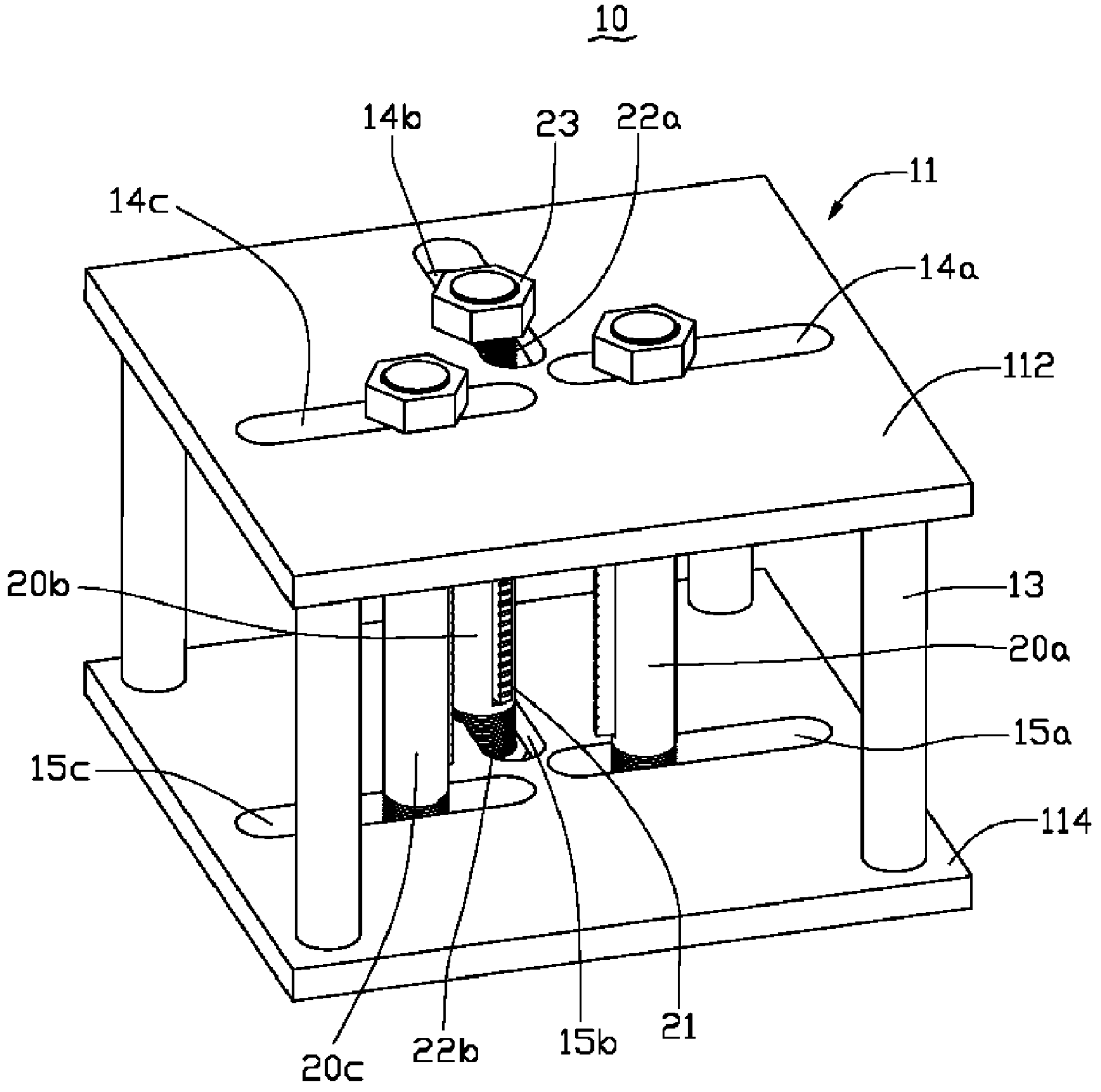
FIG. 7 (RELATED ART)
FIG. 7 is a schematic, isometric view of a typical holding member for optical components.

FIG. 6 illustrates a fourth kind of holding member 400 for aiding the cleaning of the optical components 60, according to a fourth preferred embodiment. The holding member 400 is essentially similar to the holding member 200 except that a plurality of interspaces 430 are defined between the first and second rib plates 201, 202 and the first and second end wall 203, 204. The interspaces 430 are each a tapered in shape. Each of the tapered interspaces 430 is essentially similar to interspace 330 of the holding member 300. Space sizes along the VI-VI cross-sectional direction of the tapered interspaces 430 could vary. As such, the holding member 400 can simultaneously hold various kinds of optical components 60 without adjusting the holding member 400 and/or without requiring a variety of particularly sized and/or spaced grooves 40*a*, 40*b*, as suggested in the disclosure of FIG. 5 mentioned above.

The holding members 100, 200, 300, 400 can be made by a typical molding process, for example, an injection molding process or an extrusion molding process. The first and second rib plates 201, 202, the first and second end wall 203, 204, and the spacer plates 205 can be integrally formed. Alternatively, the first and second rib plates 201, 202 and the spacer plates 205 can be etched or machined (e.g., via a laser) to form a plurality of elongated grooves and then be held between the first and second end wall 203, 204, for example, via soldering or an adhesive agent.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A holding member for facilitating the cleaning of optical components, the holding member comprising:

two end walls facing toward each other; and at least two spaced plates held between the two end walls, the at least two plates defining at least one respective pair of inner surfaces, each pair of inner surfaces defining a corresponding pair of elongated grooves along a longitudinal direction thereof, one of the two end walls defining at least one through slot, each through slot communicating with a respective pair of elongated grooves, each such through slot and the respective pair of elongated grooves being cooperatively aligned with one another in a manner so as to direct the optical components into the respective pair of elongated grooves.

2. The holding member as claimed in claim 1, wherein each pair of inner surfaces is parallel to each other.

3. The holding member as claimed in claim 1, wherein each pair of inner surfaces has a tapered interspace width therebetween, the interspace being widest adjacent to the through slot.

4. The holding member as claimed in claim 1, wherein the pair of elongated grooves has space dimensions configured for fitting with a peripheral contour of the optical components being held thereby, the pair of elongated grooves being spaced at a predetermined distance, the predetermined distance being chosen for permitting an insertion of the optical components thereinto and a retention of the optical components therebetween.

5. The holding member as claimed in claim 1, wherein the at least two plates comprise a plurality of plates extending parallel to each other, the plurality of plates thereby defining a plurality of pairs of respective inner surfaces, each pair of respective inner surfaces defining a pair of corresponding elongated grooves along a longitudinal direction thereof, at least one of the two end walls defining a plurality of through slots, each slot of the plurality of through slots communicating with a respective pair of elongated grooves.

6. The holding member as claimed in claim 5, wherein a width of an interspace separating each different pair of respective plates is uniform.

7. The holding member as claimed in claim 5, wherein a width of an interspace separating each different pair of respective plates is variable.

8. The holding member as claimed in claim 5, wherein the plurality of plates are selected from the group consisting of: rectangular, tapered, and trapezoidal.

9. The holding member as claimed in claim 5, wherein each pair of inner surfaces has a tapered interspace width therebetween, the interspace being widest adjacent to the through slot.

10. The holding member as claimed in claim 1, wherein cross-sections of the elongated grooves are selected from the group consisting of: partially rectangular, curved, semi-ellipsoid, and semicircular.

11. The holding member as claimed in claim 1, wherein the at least two spaced plates comprise two spaced plates extending parallel to each other.

12. The holding member as claimed in claim 11, wherein the two spaced plates and the two end walls have outer surfaces configured for preventing scratching of the optical components held by the two spaced plates.

13. The holding member as claimed in claim 11, wherein the two spaced plates and the two end walls are generally rectangular in shape.

14. The holding member as claimed in claim 11, wherein the two spaced plates are essentially perpendicular to the two end walls, and the two spaced plates and the two end walls cooperatively form an interspace therebetween.

15. The holding member as claimed in claim 14, wherein the elongated grooves each have a predetermined groove height, and the groove height of the elongated grooves is slightly larger than a corresponding thickness of the optical components, such that the optical components are insertable into the elongated grooves and can move and turn in the interspace.

16. The holding member as claimed in claim 1, wherein each through slot has a slot height and a slot length, the slot height being slightly larger than a thickness of the optical components, the slot length being slightly larger than a width of the optical components, such that each optical component is insertable through the through slot.

* * * * *